United States Patent
Liao

(10) Patent No.: US 9,167,470 B2
(45) Date of Patent: Oct. 20, 2015

(54) HANDLING SIGNALING CONGESTION AND RELATED COMMUNICATION DEVICE

(75) Inventor: Ching-Yu Liao, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 175 days.

(21) Appl. No.: 13/198,726

(22) Filed: Aug. 5, 2011

(65) Prior Publication Data

US 2012/0033551 A1    Feb. 9, 2012

Related U.S. Application Data

(60) Provisional application No. 61/370,814, filed on Aug. 5, 2010.

(51) Int. Cl.
| | | |
|---|---|---|
| H04L 12/26 | (2006.01) | |
| H04W 28/02 | (2009.01) | |
| H04W 48/06 | (2009.01) | |
| H04W 4/00 | (2009.01) | |

(52) U.S. Cl.
CPC .............. *H04W 28/02* (2013.01); *H04W 4/005* (2013.01); *H04W 48/06* (2013.01)

(58) Field of Classification Search
CPC .. H04L 47/10; H04L 12/5695; H04L 47/2441
USPC ........................................................ 370/230
See application file for complete search history.

(56) References Cited

U.S. PATENT DOCUMENTS

| | | | | |
|---|---|---|---|---|
| 4,007,449 A | * | 2/1977 | Vercesi | 710/58 |
| 4,587,651 A | * | 5/1986 | Nelson et al. | 370/405 |
| 5,566,206 A | * | 10/1996 | Butler et al. | 375/225 |
| 6,198,722 B1 | * | 3/2001 | Bunch | 370/229 |
| 6,208,653 B1 | * | 3/2001 | Ogawa et al. | 370/395.52 |
| 6,404,822 B1 | * | 6/2002 | Ben-Michael et al. | 375/296 |
| 7,231,215 B2 | * | 6/2007 | Lewis et al. | 455/450 |
| 7,277,390 B2 | * | 10/2007 | Kang | 370/231 |
| 7,284,051 B1 | * | 10/2007 | Okano et al. | 709/226 |
| 7,337,253 B2 | * | 2/2008 | Kasper | 710/260 |
| 7,376,130 B2 | * | 5/2008 | Farmwald | 370/352 |
| 7,430,261 B2 | * | 9/2008 | Forest et al. | 375/364 |
| 7,849,486 B2 | * | 12/2010 | Russ et al. | 725/74 |
| 7,852,816 B2 | * | 12/2010 | Jung | 370/338 |

(Continued)

FOREIGN PATENT DOCUMENTS

| | | |
|---|---|---|
| CN | 101142766 A | 3/2008 |
| CN | 101448327 A | 6/2009 |

(Continued)

OTHER PUBLICATIONS

3GPP TS 22.368 ver. 10.1.0, Rel. 10, Jun. 2010.*

(Continued)

*Primary Examiner* — Melvin Marcelo
*Assistant Examiner* — Peter Solinsky
(74) *Attorney, Agent, or Firm* — Winston Hsu; Scott Margo

(57) ABSTRACT

A method of handling signaling congestion for a machine type communication (MTC) device and/or a MTC server in a wireless communication system is disclosed. The method comprises receiving system information from a network; and stopping a triggering operation in a communication window according to the system information, wherein the system information indicates occurrence of a signaling congestion situation in the network.

10 Claims, 9 Drawing Sheets

(56) References Cited

U.S. PATENT DOCUMENTS

| | | | |
|---|---|---|---|
| 7,970,403 B2* | 6/2011 | Ishii et al. | 455/436 |
| 8,107,968 B2* | 1/2012 | Kasslin et al. | 455/451 |
| 8,218,434 B1* | 7/2012 | Brown et al. | 370/227 |
| 8,244,205 B2* | 8/2012 | Wu | 455/404.1 |
| 8,254,975 B2 | 8/2012 | Kroth | |
| 8,330,589 B2* | 12/2012 | Ortiz et al. | 340/328 |
| 8,347,163 B2* | 1/2013 | Zheng | 714/748 |
| 8,391,401 B2* | 3/2013 | Wang et al. | 375/295 |
| 8,477,628 B2* | 7/2013 | Ishii | 370/238 |
| 8,489,670 B1* | 7/2013 | Fletcher et al. | 709/203 |
| 8,549,567 B2* | 10/2013 | Russ et al. | 725/78 |
| 8,593,954 B2* | 11/2013 | Zhuang | 370/230 |
| 8,625,686 B2* | 1/2014 | Li et al. | 375/260 |
| 8,638,724 B1* | 1/2014 | Knoop et al. | 370/328 |
| 8,661,322 B2* | 2/2014 | Julian et al. | 714/774 |
| 2004/0158765 A1* | 8/2004 | Charzinski | 714/4 |
| 2005/0058097 A1* | 3/2005 | Kang et al. | 370/329 |
| 2005/0089001 A1* | 4/2005 | Nishikawa | 370/338 |
| 2005/0222692 A1* | 10/2005 | Karlsson et al. | 700/28 |
| 2005/0249139 A1* | 11/2005 | Nesbit | 370/312 |
| 2006/0251076 A1* | 11/2006 | Lee et al. | 370/392 |
| 2007/0008884 A1* | 1/2007 | Tang | 370/230 |
| 2007/0036074 A1* | 2/2007 | Tsai et al. | 370/229 |
| 2007/0047461 A1* | 3/2007 | Seo et al. | 370/252 |
| 2008/0052386 A1* | 2/2008 | Johnson et al. | 709/223 |
| 2008/0117811 A1* | 5/2008 | Seo et al. | 370/230 |
| 2008/0137536 A1 | 6/2008 | Hede | |
| 2008/0239957 A1* | 10/2008 | Tokura et al. | 370/235 |
| 2008/0253284 A1* | 10/2008 | Montalvo et al. | 370/230 |
| 2008/0279210 A1* | 11/2008 | Naka et al. | 370/448 |
| 2008/0317041 A1* | 12/2008 | Ben-Lulu et al. | 370/395.42 |
| 2009/0005053 A1* | 1/2009 | Agin et al. | 455/450 |
| 2009/0086861 A1* | 4/2009 | Yavuz et al. | 375/346 |
| 2009/0161546 A1* | 6/2009 | Key et al. | 370/236 |
| 2009/0164679 A1* | 6/2009 | Hars et al. | 710/108 |
| 2009/0190518 A1* | 7/2009 | Kim et al. | 370/312 |
| 2009/0196182 A1* | 8/2009 | Barnett et al. | 370/236.1 |
| 2010/0020689 A1* | 1/2010 | Tang | 370/235 |
| 2010/0081394 A1* | 4/2010 | Mashimo | 455/70 |
| 2010/0093429 A1* | 4/2010 | Mattice et al. | 463/25 |
| 2010/0103816 A1* | 4/2010 | Eiro | 370/230 |
| 2010/0103913 A1* | 4/2010 | Sung et al. | 370/338 |
| 2010/0118698 A1* | 5/2010 | Yokobori et al. | 370/230 |
| 2010/0238799 A1* | 9/2010 | Sebire | 370/225 |
| 2011/0019544 A1* | 1/2011 | Lemaire et al. | 370/230 |
| 2011/0019555 A1* | 1/2011 | Gotoh et al. | 370/252 |
| 2011/0029347 A1* | 2/2011 | Kozat et al. | 705/8 |
| 2011/0029971 A1* | 2/2011 | Yamasaki et al. | 718/1 |
| 2011/0044239 A1* | 2/2011 | Cai et al. | 370/328 |
| 2011/0085532 A1* | 4/2011 | Scherzer et al. | 370/338 |
| 2011/0096928 A1* | 4/2011 | Fukuoka et al. | 380/270 |
| 2011/0142028 A1* | 6/2011 | Kasslin et al. | 370/350 |
| 2011/0182177 A1* | 7/2011 | Sedlacek et al. | 370/230 |
| 2011/0194506 A1* | 8/2011 | Hirsch et al. | 370/329 |
| 2011/0222458 A1* | 9/2011 | Wu et al. | 370/312 |
| 2011/0300858 A1* | 12/2011 | Lee et al. | 455/425 |
| 2012/0026931 A1* | 2/2012 | Wentink | 370/312 |
| 2012/0094656 A1* | 4/2012 | Huang et al. | 455/423 |
| 2012/0201151 A1* | 8/2012 | Kubota | 370/252 |
| 2012/0230246 A1* | 9/2012 | Ishihara | 370/315 |
| 2012/0269062 A1* | 10/2012 | Cho | 370/230 |
| 2012/0287812 A1* | 11/2012 | Cho et al. | 370/252 |
| 2013/0051228 A1* | 2/2013 | Kim et al. | 370/230 |
| 2013/0064156 A1* | 3/2013 | Park et al. | 370/311 |
| 2013/0070624 A1* | 3/2013 | Nguyen et al. | 370/252 |
| 2013/0182784 A1* | 7/2013 | Wang et al. | 375/259 |
| 2013/0194986 A1* | 8/2013 | Chen et al. | 370/311 |
| 2013/0259018 A1* | 10/2013 | Ji et al. | 370/338 |
| 2013/0272260 A1* | 10/2013 | Bitran et al. | 370/329 |
| 2013/0283109 A1* | 10/2013 | Oksman | 714/712 |
| 2014/0071977 A1* | 3/2014 | Morrill et al. | 370/351 |
| 2014/0089442 A1* | 3/2014 | Kim et al. | 709/206 |

FOREIGN PATENT DOCUMENTS

| | | |
|---|---|---|
| EP | 2101508 A1 | 9/2009 |
| EP | 2192807 A1 | 6/2010 |
| WO | WO 2012104629 A3 * | 12/2012 |

OTHER PUBLICATIONS

3GPP TS 23.107 ver. 9.1.0, Rel. 9, Jun. 2010.*
IEEE Std 802.11-2007, Jun. 12, 2007.*
Distributed Reservation-based MAC Protocol for UWB WiMedia MAC, Jiseon Lee, Hyeonmok Ko, Cheeha Kim.*
IEEE Std 802.11-2007.*
S1-110414, 3GPP TSG-SA WG1 Meeting #53, Feb. 2011.*
Office action mailed on Feb. 14, 2013 for the European application No. 11006466.4, filing date Aug. 5, 2011, p. 1-5.
Samsung, "Solution for Congestion Control for MTC Mobile Terminating Communication", 3GPP TSG SA WG2 Meeting #79E, TD S2-103120, Jul. 6-13, 2010, Elbonia, XP050458206, p. 1-4.
3GPP TS 22.368 V2.0.0 (Mar. 2010) Technical Specification 3rd Generation Partnership Project; Technical Specification Group Services and System Aspects; Service requirements for machine-type communications; Stage 1 (Release 10).
3GPP TR 23.888 V1.3.0 (Jun. 2011) Technical Report 3rdGeneration Partnership Project; Technical Specification Group Services and System Aspects; System Improvements for Machine-Type Communications; (Release 11).
European patent application No. 11006466.4, European Search Report mailing date: Nov. 16, 2011.
3GPP TS 22.368 V10.1.0 (Jun. 2010), "3rd Generation Partnership Project; Technical Specification Group Services and System Aspects; Service requirements for Machine-Type Communications (MTC); Stage 1 (Release 10)", XP002661357, p. 1-24.
Office action mailed on Jul. 15, 2014 for the China application No. 201110224620.X, filing date: Aug. 5, 2011.

* cited by examiner

HANDLING SIGNALING CONGESTION AND RELATED COMMUNICATION DEVICE

CROSS REFERENCE TO RELATED APPLICATIONS

This application claims the benefit of U.S. Provisional Application No. 61/370,814 filed on Aug. 5, 2010 and entitled "Method and Apparatus of Signaling Congestion/Overload Handling for Wireless Network with Machine Type Communication", the contents of which are incorporated herein.

BACKGROUND OF THE INVENTION

1. Field of the Invention

The application relates to a method and a related communication device used in a wireless communication system and related communication device, and more particularly, to a method of handling signaling congestion and a related communication device in a wireless communication system with machine type communication.

2. Description of the Prior Art

Machine to Machine (M2M) communication (also referred to as "machine-type communications" or "MTC") may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

Depending on its implementation, M2M communication may be different from some current communication models. For example, M2M communication may involve new or different market scenarios. M2M communications may also differ from some current technologies in that M2M communication may involve a large number of wireless transmit/receive units (WTRUs), and/or may involve very little traffic per WTRU. Additionally, relative to some current technologies, M2M communication may involve lower costs and less effort to deploy.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M WTRUs. Additionally, further enhancements to these technologies may provide additional opportunities for the deployment of M2M-based solutions.

Referring to 3GPP TS 22.368, the requirements related to MTC Device triggering operation include the following: the network shall be able to trigger MTC Devices to initiate communication with the MTC Server based on a trigger indication from the MTC Server; a MTC Device shall be able to receive trigger indications from the network and shall establish communication with the MTC Server when receiving the trigger indication. The MTC Feature Time Controlled is intended for use with MTC devices and/or MTC Applications that are delay tolerant and can send or receive data only during defined time intervals and avoid unnecessary signaling outside these defined time intervals. The network operator may allow such MTC devices and/or MTC Applications to send/receive data and signaling outside of these defined time intervals but charge differently for such traffic. For the Time Controlled MTC Feature:

The network operator shall be able to reject access requests per MTC Device (e.g. attach to the network or set up a data connection) outside a defined access grant time interval.
  The network operator shall be able to allow access (e.g. attach to the network or set up a data connection) outside a defined access grant time interval and charge this differently.
  The network shall reject access requests per MTC Device (e.g. attach to the network or set up a data connection) during a defined forbidden time interval (e.g. to allow maintenance of a MTC Server).
  The local network shall be able to alter the access grant time interval based on local criteria (e.g. daily traffic load, time zones). The forbidden time interval shall not be altered.

In the prior art, the solutions of time-controlled mechanisms, including network access control by the PLMN and randomized triggering of time-controlled MTC operations, for MTC in wireless network are not taken signaling congestion/overload control into account. This may cause some issues as described below. The possible solutions to tackle these issues shall not add extra signalling burden to the network.

The triggering operation is randomized for the time-controlled MTC devices by MTC devices or the network including MTC server. However if signaling congested/overloaded situation happens in the network, the triggering operation performing by the MTC devices or the network would make the congested/overloaded situations worse.

A MME (mobility management entity) Load Balancing functionality permits UEs that are entering into an MME Pool Area to be directed to an appropriate MME in a manner that achieves load balancing between MMEs. This is achieved by setting a Weight Factor for each MME, such that the probability of the eNodeB selecting an MME is proportional to its Weight Factor. The Weight Factor is typically set according to the capacity of an MME node relative to other MME nodes. The Weight Factor is sent from the MME to the eNodeB via S1-AP messages (see TS 36.413 [36]). If a HeNB GW is deployed, the Weight Factor is sent from the MME to the HeNB GW.

The major challenge of the machine type communication is simultaneous network access from the massive MTC devices. Even though the network is not congested/overloaded, the load rebalancing function acting on massive MTC devices may induce great volume of signaling overhead, e.g. S1, or RRC release procedures, or TAU procedures.

If the MTC device does not have valid communication window, the new communication window is provided to the MTC device by randomly initiating NAS signaling or application level, which may be outside of communication window. However the network operator may charge differently for sending/receiving data and signaling outside of a defined grant time interval.

The network retrieves grant time interval and forbidden time interval from HLR/HSS (Home Location Register/Home Subscriber Server) where the subscriptions of the MTC devices are stored. The communication window is not stored and would be randomized and configured at SGSN/MME (serving GPRS support node/mobile management entity). If the grant time interval needs to be altered, the SGSN/MME determines the new grant time interval along with new communication window and shall notify HLR/HSS and MTC devices via NAS signaling or application level. The MTC devices are allowed to access network within allotted communication window, otherwise the network can reject accesses. The MTC device can obtain allocated communication window via NAS signaling, e.g. attach or TAU procedure, or application level. Please refer to FIG. 1, which illustrates successful completion of communication task.

In the case of using NAS signaling for updating communication window, if there is no valid communication window, the MTC device might initiate NAS signaling outside of communication window and obtain the communication window from accept or reject message. However there are situations that the MTC devices do not have valid communication windows and need to initiate NAS signaling randomly, which increase signaling overheads as shown in FIG. 2:

e.g1. the altered communication window is not successfully sent to the MTC devices via accept or reject message.

e.g.2. the MTC device is barred by RAN during its allocated communication window.

e.g.3. the MTC device or the network ceases triggering operation due to congestion/overload situation.

e.g.4. the MTC device is forced to detach from the network with network congested cause and a backoff timer before it completes its communication task. In this case, the NAS signaling may be initiated outside of the communication window when the backoff timer is expired if applied.

The above mentioned situations would result in unpredictable signaling overheads to SGSN/MME. Latter three cases might further jeopardize the network in a congested/overloaded network.

SUMMARY OF THE INVENTION

A method of enhancing Machine type communication for Machine to Machine transmission in a wireless communication system is provided.

A method of handling signaling congestion for a communication device in a wireless communication system is disclosed. The method comprises receiving system information from a network; and stopping a triggering operation in a communication window according to the system information; wherein the system information indicates occurrence of a signaling congestion or overload situation in the network.

A method of handling signaling congestion for a mobility management entity (MME) or serving GPRS support node (SGSN) in a wireless communication system is disclosed. The method comprises not performing a load rebalancing function on a plurality of MTC devices; and performing signaling congestion control.

A method of handling signaling congestion for a MTC device in a wireless communication system is disclosed. The method comprises when a first communication window is considered invalid for the MTC device randomizing a triggering operation at a communication device in a grant time interval to request a second communication window from a network.

A method of handling signaling congestion for a network in a wireless communication system is disclosed. The method comprises providing a plurality of communication windows for a communication device in a message.

A method of handling signaling congestion for a communication device in a wireless communication system is disclosed. The method comprises receiving a plurality of communication windows in a message from a network; and accessing a network in a second communication window when the communication device fail to access the network in a first communication window.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
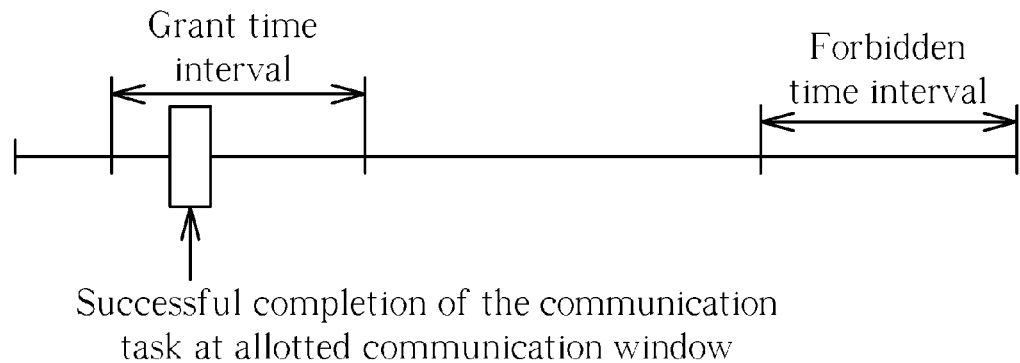
FIG. 1 illustrates successful completion of communication task in the prior art.
Figure 2:
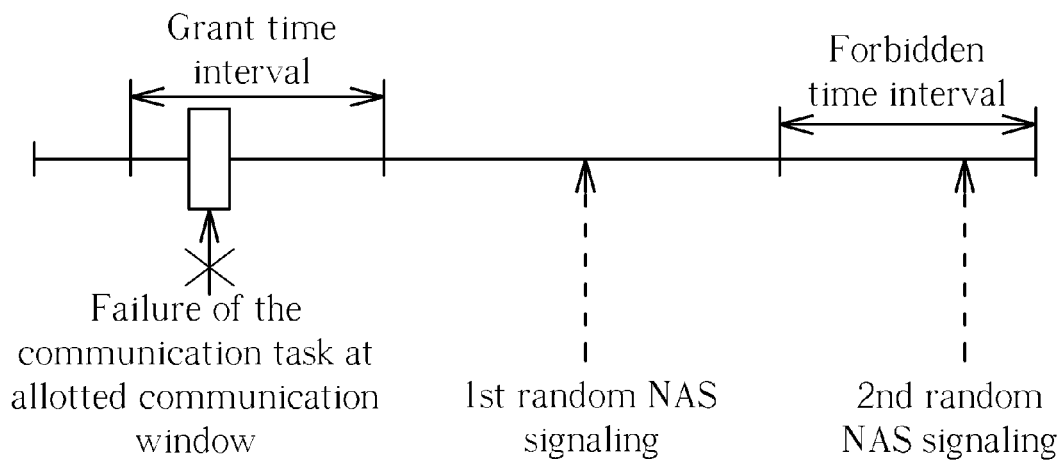
FIG. 2 illustrates a random signaling in the prior art.
Figure 3:
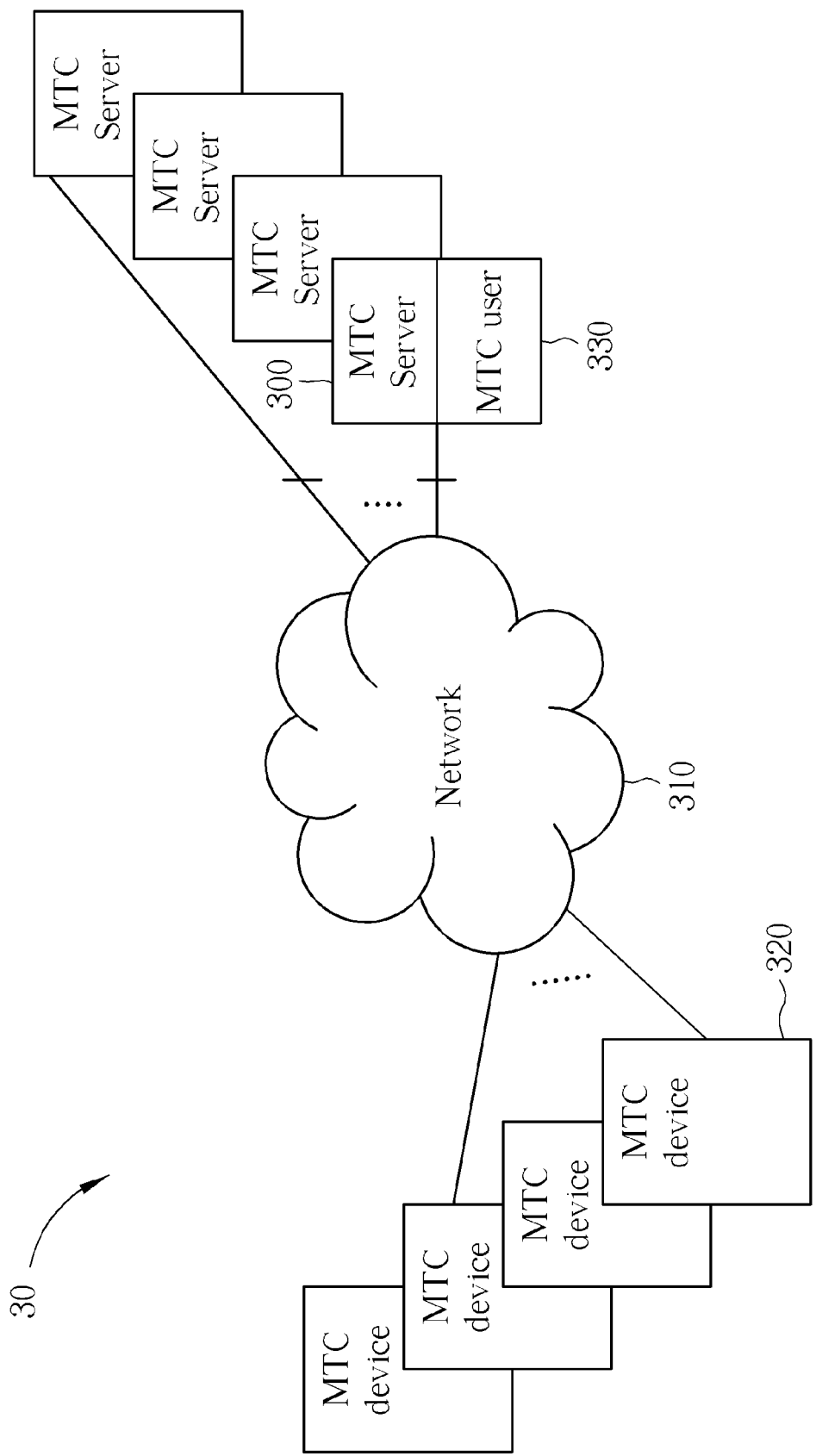
FIG. 3 illustrates an exemplary MTC architecture.

Please refer to FIG. 3, which illustrates an exemplary MTC ((Machine Type Communication) architecture 30. The MTC architecture 30 includes a plurality of MTC servers 300, a network 310 and a plurality of MTC devices 320. The MTC server 300 is located outside of the network 310 or inside of the network 310 and managed by the network operator. The MTC devices 320 may communicate with the MTC server 300. The MTC server 300 may be coupled to a MTC user 330. The MTC devices 320 may communicate through the network 310, which may communicate with the MTC server 300. The network 310 may be referred as to Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE). Please note that MTC devices 320 also can be referred as to user equipments (UEs) in a wireless communication system, which includes mobile phones, computer systems, etc.

Figure 4:
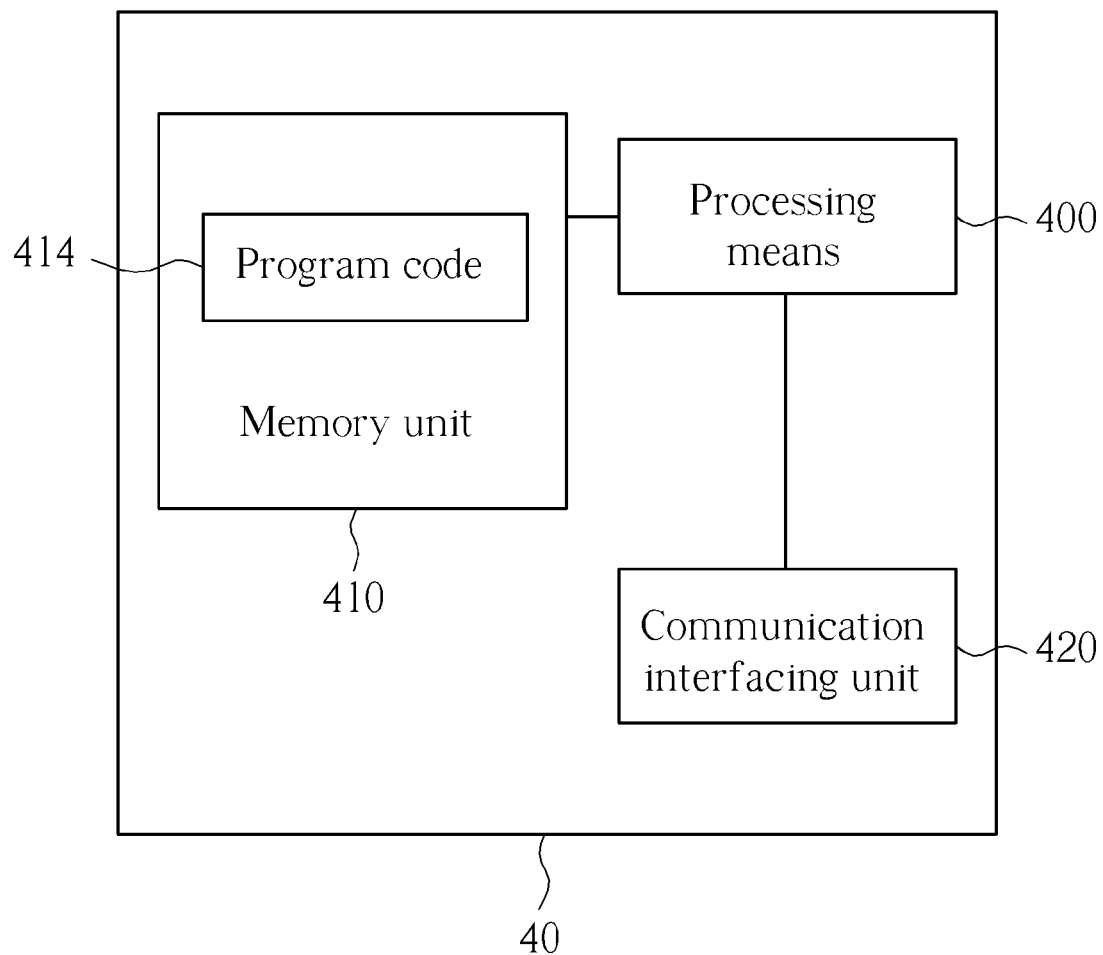
FIG. 4 is a schematic diagram of an exemplary communication device.

Please refer to FIG. 4. FIG. 4 is a schematic diagram of an exemplary communication device 40. The communication device 40 can be the MTC devices 320, the network 310 or the MTC sever 300 shown in FIG. 3 and may include a processing means 400 such as a microprocessor or ASIC, a memory unit 410, and a communication interfacing unit 420. The memory unit 410 may be any data storage device that can store program code 414 for access by the processing means 400. Examples of the memory unit 410 include but are not limited to a subscriber identity module (SIM), read-only memory (ROM), random-access memory (RAM), CD-ROMs, magnetic tapes, floppy disks, and optical data storage devices. According to processing results of the processing means 400, the communication interfacing unit 420 can be a radio transceiver or a wire/logical link for communicating with the network. MTC devices 320 with Time Controlled MTC Feature send/receive data only at certain time periods. Network operators can pre-define/allocate/alter the time period based on criteria (e.g. daily traffic load) and only allow MTC devices 320 to access the network 310 (attach to the network or send/receive data) during the time period.

Figure 5:
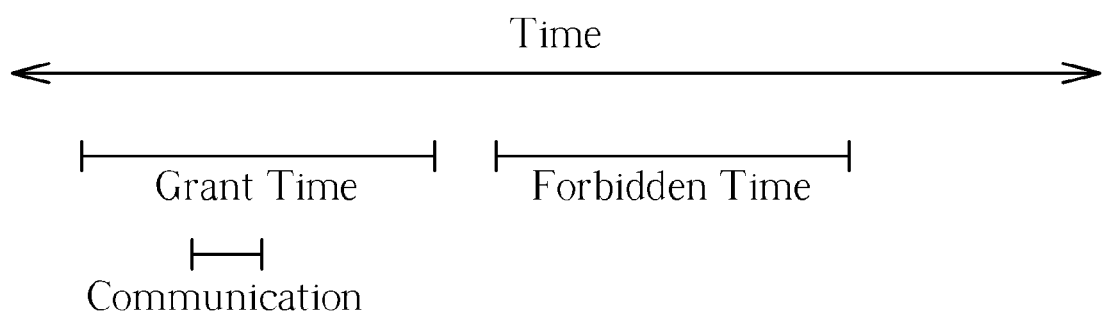
FIG. 5 illustrates an exemplary time controlled terminology.

Please refer to FIG. 5, which illustrates an exemplary time controlled terminology. Typically, the MTC user 330 agrees with an operator on a predefined/allocated/altered time period for a group of MTC devices 320. The time in which access is permitted is termed a grant time interval. The network shall communicate at the grant time interval to one of the MTC devices 320 and can also do so to the MTC server 300 and MTC user 330. The grant time interval does not overlap with a forbidden time interval.

In roaming scenarios, the local network operator may alter the access grant time interval based on local criteria, e.g. (daily traffic load, time zones) but the forbidden time interval may not be altered. It is desirable that access of MTC devices 320 with the same access grant interval is distributed across this interval in a manner to reduce peaks in the signaling and data traffic. For many applications, individual MTC devices 320 do not need the total duration of this predefined time period to communicate with the MTC server 300. Typically a 5-10 minutes communication window is sufficient for an individual MTC device 320. The network operator may limit the duration of these communication windows. To avoid network overload, the communication windows of the MTC devices 320 shall be distributed over the grant time interval e.g. through randomization of the start time of the individual communication windows. For a network operator, it can be beneficial that the MTC devices 320 are not attached outside their communication window. Therefore, the network operator should be able to enforce detach of an MTC devices 320 from the network 310 at the end of the communication window or the MTC device 320 should be able to detach itself from the network 310 at the end of the communication window. The network operator may allow MTC devices 320 to exchange signaling and send and receive data outside of defined time intervals but charge differently for such traffic.

Figure 6:
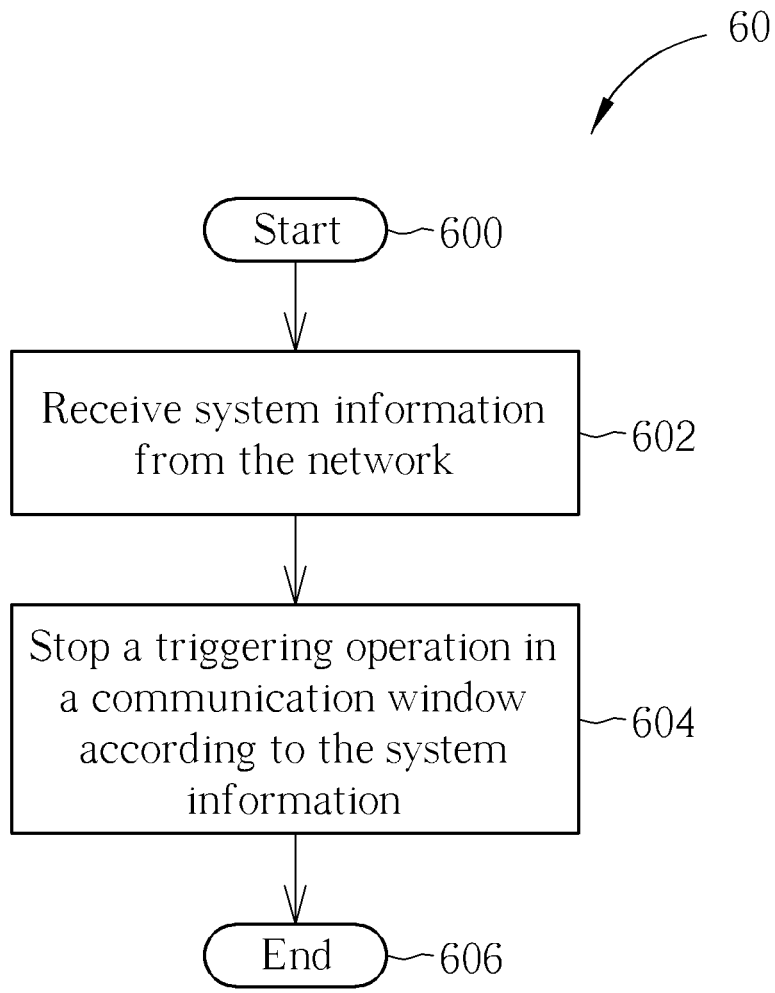
FIGS. 6-9 are flow charts of an exemplary processes.

Please refer to FIG. 6, which is a flow chart of an exemplary process 60. The process 60 is used for handling signaling congestion for a MTC device 320 and/or the MTC server 300 in the MTC architecture 30. The process 50 can be compiled into the program code 414 and includes the following steps:

Step 600: Start.

Step 602: Receive system information from the network 310.

Step 604: Stop a triggering operation in a communication window according to the system information.

Step 606: End.

According to the process 60, the MTC device 320 and/or the MTC server 300 receives the system information from the network 310. The system information is broadcast by the network 310 and indicates occurrence of a signaling congestion situation in the network 310. Upon the reception of the system information, the MTC device 320 stops the mobile originated triggering operation in the communication window or the MTC server 300 stops the mobile terminated trigger operation in the communication window. Also, the suspension of the triggering operation is clear when the system information broadcasts the system information that the network congestion/overload situation is clear. As a result, extra signaling can be reduced. When the mobile terminated triggering operation is performed by the MTC server 320 or the network 310, the network 310 shall be able to trigger MTC device 320 to initiate communication with the MTC server 300 based on received trigger indication from the MTC server 300. When the mobile originated triggering operation is performed by the MTC device 320, the MTC device 320 shall be able to establish communication with the MTC server 300 based on the stored/subscribed trigger indication or received trigger indication from the MTC server 300.

For example, when the network 310 is congested/overloaded, the network 310 broadcasts the system information about the network congestion situation to the MTC devices 320, the MTC device 320 receives the system information and then stops mobile originated triggering operation for a period of time. For example, when the network 310 is congested/overloaded, the network 310 sent the system information about the network congestion situation to the MTC servers, the MTC server 310 receives the system information and then stops mobile terminated triggering operation for a period of time. If the trigger indication sent from the MTC server 310 is buffered in the network node for further mobile terminated triggering operation, the buffered triggering requests are stopped at the network node when the network is congested/overloaded.

In addition, the MTC device 320 and/or the MTC server 300 may determine whether to stop the triggering operation in the communication window according to priority of an application included in a MTC subscription.

Figure 7:
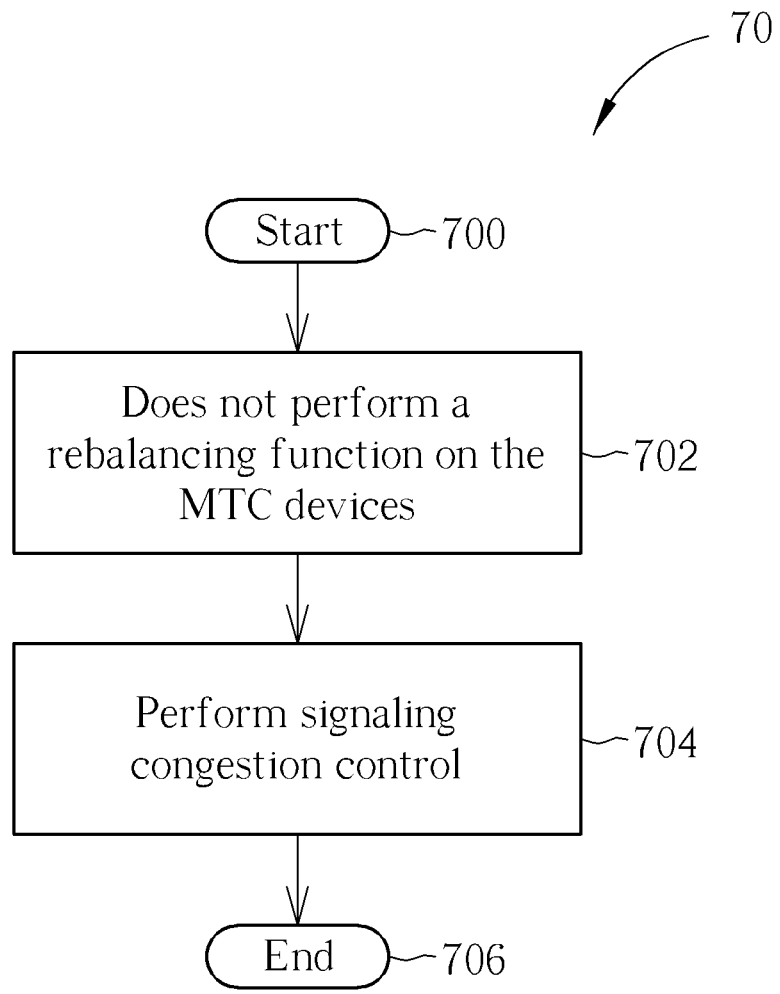

Please refer to FIG. 7, which is a flow chart of an exemplary process 70. The process 70 is used for handling signaling congestion for the network 310 in the MTC architecture 30. The process 70 can be compiled into the program code 414 and includes the following steps:

Step 700: Start.

Step 702: Does not perform a rebalancing function on the MTC devices 320.

Step 704: Perform signaling congestion control.

Step 706: End.

According to process 70, the network 310 is allowed to perform load rebalancing by offloading part of the subscribers from the network. The network 310 does not perform the rebalancing function on the MTC devices 320. The network 310 may be referred as to a mobile management entity (MME) or serving GPRS support node (SGSN). The MME/SGSN is responsible for mobility management, non-access-stratum layer signaling processing, and user mobility management in the context of the management control of surface-related work. Instead of performing the rebalancing function, the network 310 performs signaling congestion control depending on the congestion situation. Since the load rebalancing function is not performed on massive MTC devices 320, great volume of signaling overhead, e.g. S1, or RRC release procedures, or TAU procedures can be reduced.

For example, the network 310 does not perform load rebalancing to the MTC device 320 which communication window is not approaching for triggering operation. For MTC device 320 which initiates NAS signaling for mobile originated triggering operation, the network 310 performs NAS level signaling congestion control if needed.

Figure 8:
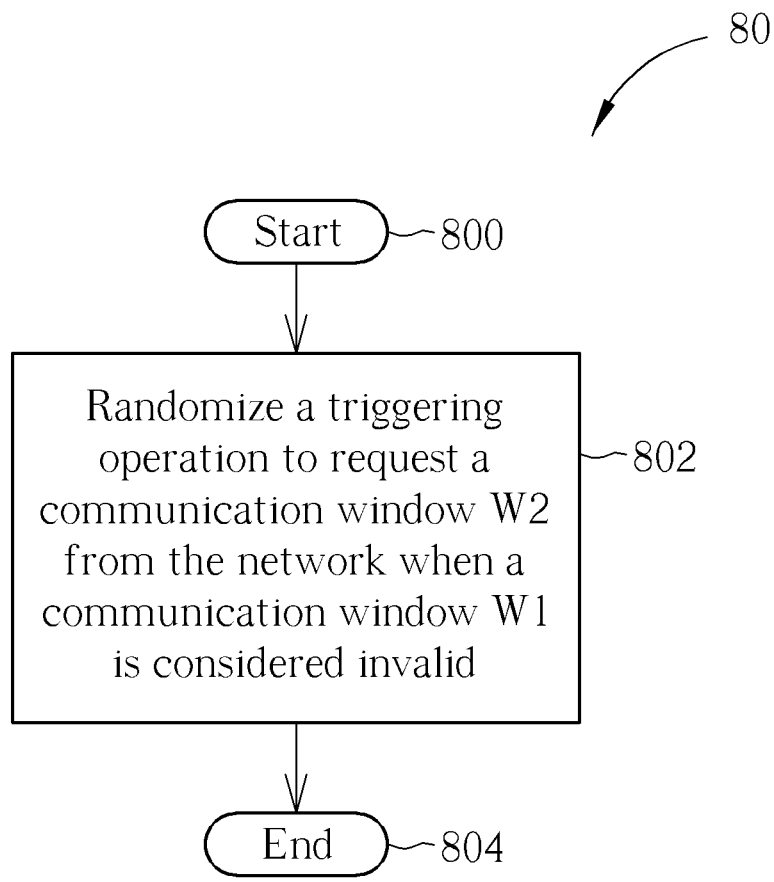

Please refer to FIG. 8, which is a flow chart of an exemplary process 80. The process 80 is used for handling signaling congestion for a MTC device 320 in the MTC architecture 30. The process 80 can be compiled into the program code 414 and includes the following steps:

Step 800: Start.

Step 802: Randomize a triggering operation at the MTC device 320 or the MTC server 300 to request a communication window W2 from the network 310 when a communication window W1 is considered invalid for a MTC device 320.

Step 804: End.

According to the process 80, if the MTC device 320 does not have a valid communication window W1, the MTC device 320 or the MTC server 300 randomizes the triggering operation in a grant time interval for requesting a valid communication window W2 from the network 310.

For example, when the MTC device 320 does not complete the transmission at the communication window and it does not have a valid communication window, the MTC device 320 randomizes the triggering operation in the grant time interval to request a new communication window. The network 310 can alter the allocation of the grant time interval and/or new communication window and then sends the new allocation to the MTC device 320 and/or the MTC server 300.

Figure 9:
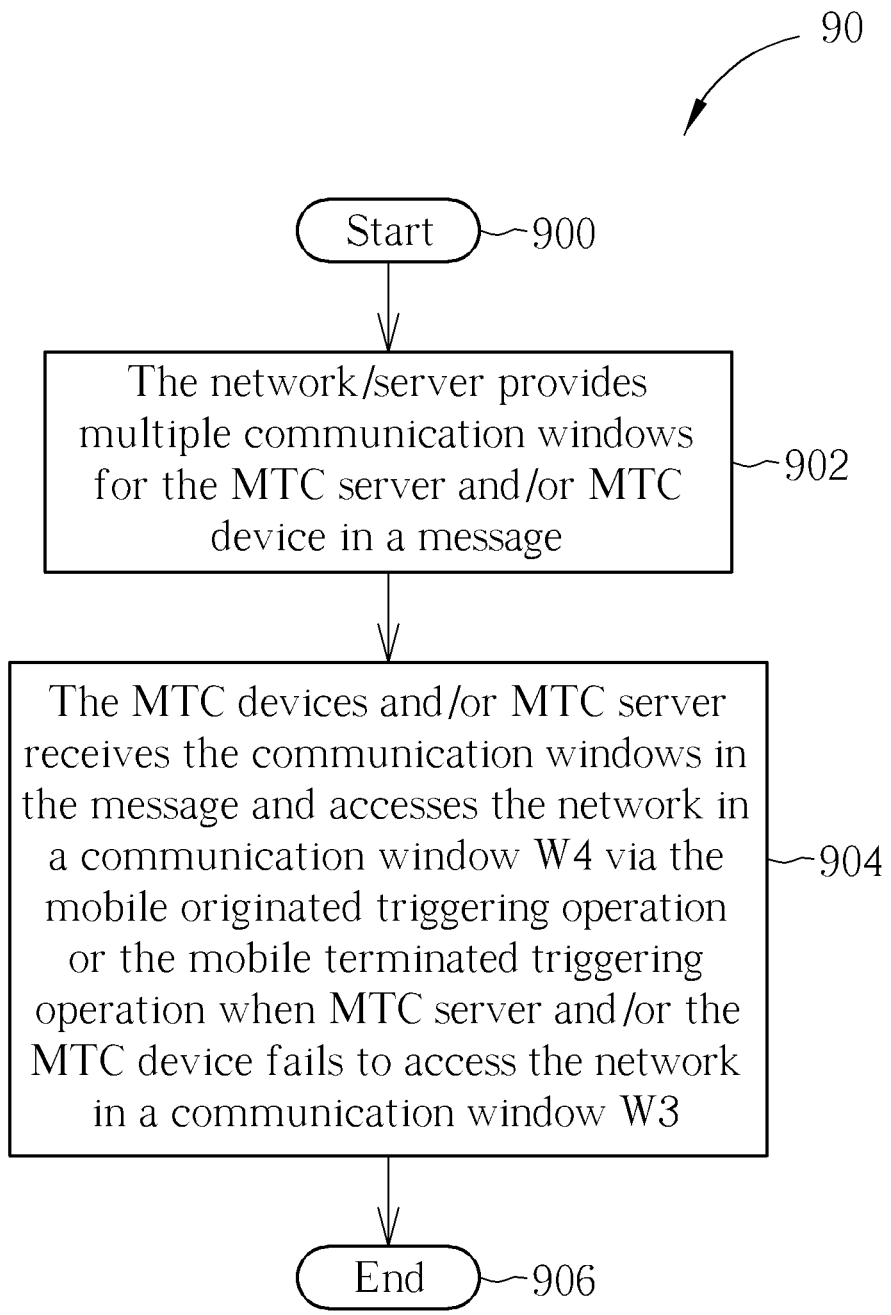

For example, when the MTC server 300 does not receive the transmission from a MTC device at the communication window, the MTC server 300 determines that the MTC device has no valid communication window to complete its transmission. The MTC server 300 randomizes the triggering operation in a grant time interval of the MTC device 320 to request a new communication window from the network. The network 310 can alter the allocation of the grant time interval and/or new communication window and then sends the new allocation to the MTC server 300 and/or the MTC device 320. Please refer to FIG. 9, which is a flow chart of an exemplary process 90. The process 90 is used for handling signaling congestion for a MTC device 320 and the network 310/MTC server 300 in the MTC architecture 30. The process 80 can be compiled into the program code 414 and includes the following steps:

Step 900: Start.

Step 902: The network 310/MTC server 300 provides multiple communication windows for the MTC server 310 and/or MTC device 320 in a message.

Step 904: The MTC devices 320 and/or MTC server 310 receives the communication windows in the message and accesses the network 310 in a communication window W4 via the mobile originated triggering operation or the mobile terminated triggering operation when MTC server 310 and/or the MTC device 320 fails to access the network 310 in a communication window W3.

Step 906: End.

According to process 90, more than one communication windows are provided for the MTC server 310 and/or the MTC device 320 in the message. The message may be referred as to a accept message or a reject message or a notification message. The MTC server 310 and/or MTC devices 320 can confirm that the communication windows are successfully received via the message. When the MTC server 310 and/or the MTC device 320 fails to access the network 310 in the communication window W3, e.g. due to access barring or occurrence of signaling congestion, MTC server 310 and/or the MTC device 320 accesses the network 310 in the communication window W4. In other words, when the network 310/MTC server 300 provides multiple communication windows for the MTC devices 320 the MTC device 320 can defers the access to the network 310 and the MTC server 300 to a valid communication window (e.g. communication window W4) if the current communication window (e.g. communication window W3) is invalid. Such that the MTC devices 320 can obtain more opportunities for transmission and the unpredictable signaling overheads which result from randomly initiating non-access stratum (NAS) signaling for updated communication windows can be reduced. Preferably, the network 310 herein can be MME/SGSN.

In addition, MTC server 310 and/or the MTC device 320 also abort accessing the network 310 in the communication window W3. When the MTC device 320 is triggered and completes its transmission in any one of the allocated communication windows, the network 310 and/or MTC server 300 and the MTC device 320 clear the rest of the communication windows. So the network 310 and/or MTC server 300 can allocate resource corresponding to the rest of the communication windows for other usage.

Figure 10:
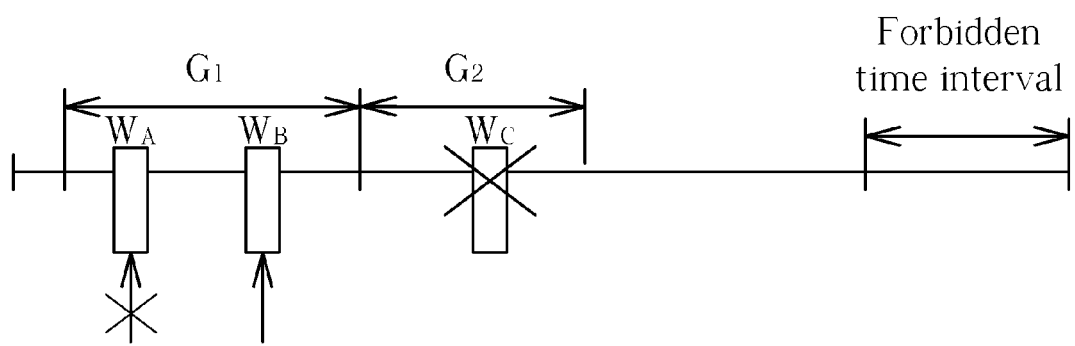
FIG. 10 illustrates exemplary communication window allocation.

Further, MTC server 310 and/or the MTC device 320 may receive a congestion/overload indicator from the network. The congestion/overload indicator is categorized based on severity of a network congestion situation or is represented as a back-off timer in the system information/accept/reject/notification message. Based on a value of congestion/overload indicator, the MTC server 310 and/or the MTC device 320 determines how long the congestion/overload situation is going to last. If there is any communication window within congestion/overload period, MTC server 310 and/or the MTC device 320 aborts to access the network 310 in that communication window. According to the congestion/overload indicator, MTC server 310 and/or the MTC device 320 determines in how many of the communication windows MTC server 310 and/or the MTC device 320 abort accessing the network 310. By this way, the MTC device 320 can save more power since the MTC device 320 does not need to read the congestion/overload indicator when the communication window is within the congestion/overload period. Also the MTC server 310 can release resource for triggering other MTC device 320 which accesses a network without congestion/overload. Please refer to FIG. 10, which illustrate exemplary communication window allocation. Three communication windows $W_A$, $W_B$ and $W_C$ are provided in two grant time interval G1 and G2. The MTC device and/or the MTC server fails to access the network in the communication window $W_A$ so the MTC device and/or the MTC server defers the transmission to the communication window $W_B$. If the MTC device completes transmission in the communication window $W_B$, the MTC device and the MTC server and the network clear the communication device $W_C$. That means that MTC device and the MTC server is not allowed to use the communication window $W_C$. The MTC device and the MTC server and the network may allocate resource to the communication window $W_C$ for other usage.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip.

Examples of the electronic system can include system on chip (SOC), system in package (Sip), computer on module (COM), and the communication device 20 in which the processing means 200 processes the program code 414 related to the abovementioned processes and the processed results can handling signaling congestion for a wireless network with machine type communication.

To sum up, when the signaling congestion/overload occurs in the network, the MTC device and MTC server stop the triggering operation to avoid extra signaling. The MME does not perform the load rebalancing function. Instead, the MME performs signaling congestion control. If the MTC device does not have valid communication window, the MTC device and/or the MTC server randomizes the triggering operation in the grant time interval to request a valid communication window from the network. In addition, more than one communication windows can be provided for the MTC device and the MTC server. As a result, the MTC device has more opportunities for completing transmission without generating extra signaling overheads to request for a new communication window.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling signaling congestion for a communication device in a wireless communication system, wherein the communication device is granted for communication in a communication window by a network of the wireless communication system, the communication device is at least one of an MTC device and an MTC server, the at least one of the MTC device and the MTC server are connected via the network, the method comprising:
  receiving system information broadcasted by the network; and
  the at least one of the MTC device and the MTC server stopping a triggering operation in the communication window according to the system information;
  wherein the system information indicates occurrence of a signaling congestion or overload situation in the network;
  wherein the triggering operation comprises the network triggering the MTC device to initiate communication with the MTC server based on a trigger indication from the MTC server, and the MTC device receiving the trigger indication from the network and establishing communication with the MTC server when receiving the trigger indication.

2. The method of claim 1 further comprising determining whether to stop the triggering operation in the communication window according to priority of an application included in a machine type communication (MTC) subscription.

3. A method of handling signaling congestion for a machine type communication (MTC) device in a wireless communication system, the method comprising:
  when a first communication window for communicating with an MTC server is considered invalid for the MTC device, randomizing a triggering operation at a communication device in a grant time interval to request a second communication window for communicating with the MTC server from a network;
  wherein the first communication window is considered invalid for the MTC device when the MTC device does not complete the transmission at the first communication window or the MTC server does not receive the transmission from the MTC device at the communication window.

4. The method of claim 3, wherein the communication device is at least one of the MTC device and a MTC server.

5. The method of claim 1, wherein the stopping step comprises at least one of:
  the MTC device stopping a mobile originated triggering operation in the communication window; and
  the MTC server stopping a mobile terminated trigger operation in the communication window.

6. The method of claim 1, further comprising:
  receiving another system information generated from the network; and
  the at least one of the MTC device and the MTC server resuming the triggering operation when the another system information indicates the signaling congestion or overload situation in the network is clear.

7. A method of handling signaling congestion for a network in a wireless communication system, the method comprising:
  providing a plurality of communication windows in a message only for a communication device to successfully access the network in only one communication window among the plurality of communication windows;
  wherein the communication device defers accessing the network to a second communication window among the plurality of communication windows if the communication device fails to access the network in a first communication window among the plurality of communication windows;
  wherein the plurality of communication windows is used for the communication device to access the network without contention.

8. The method of claim 7 further comprising clearing the rest of the plurality of communication windows in the network and the communication device when the communication device completes transmission in one of the plurality of communication windows.

9. A method of handling signaling congestion for a communication device in a wireless communication system, wherein the communication device is at least one of a machine type communication (MTC) device and an MTC server, the at least one of the MTC device and the MTC server are connected via a network in the wireless communication system, the method comprising:
  receiving at least one information including a plurality of communication windows and an indicator from the network, wherein the indicator is categorized based on severity of the network congestion situation;
  determining how many communication windows are invalid among the plurality of communication windows in which the communication device should abort accessing the network according to the received indicator; and
  accessing the network in a second communication window of the plurality of communication windows without requesting for a new communication window from the network if the communication device fails to access the network in a first communication window of the plurality of communication window;
  wherein the plurality of communication windows is used for the communication device to access the network without contention.

10. The method of claim 9 further comprising aborting accessing the network in the first communication window.

* * * * *